(12) United States Patent
McKenna et al.

(10) Patent No.: US 8,788,350 B2
(45) Date of Patent: Jul. 22, 2014

(54) HANDLING PAYMENT RECEIPTS WITH A RECEIPT STORE

(75) Inventors: Sean Michael McKenna, Seattle, WA (US); Stuart Henry Seelye Marshall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 166 days.

(21) Appl. No.: 12/138,434

(22) Filed: Jun. 13, 2008

(65) Prior Publication Data

US 2009/0313132 A1 Dec. 17, 2009

(51) Int. Cl.
| | |
|---|---|
| G06Q 20/00 | (2012.01) |
| G07G 5/00 | (2006.01) |
| G07B 17/00 | (2006.01) |
| G06Q 20/20 | (2012.01) |
| G06Q 40/00 | (2012.01) |

(52) U.S. Cl.
CPC ............ *G06Q 20/204* (2013.01); *G06Q 20/209* (2013.01); *G06Q 40/10* (2013.01)
USPC .................................. 705/17; 705/24; 705/30

(58) Field of Classification Search
USPC ...................................................... 705/30, 40
See application file for complete search history.

(56) References Cited

U.S. PATENT DOCUMENTS

| | | | |
|---|---|---|---|
| 5,559,313 A * | 9/1996 | Claus et al. ..................... | 705/30 |
| 5,739,512 A | 4/1998 | Tognazzini | |
| 6,067,529 A | 5/2000 | Ray et al. | |
| 6,119,946 A | 9/2000 | Teicher | |
| 6,195,542 B1 | 2/2001 | Griffith | |
| 6,356,633 B1 | 3/2002 | Armstrong | |
| 6,487,540 B1 | 11/2002 | Smith et al. | |
| 6,505,236 B1 | 1/2003 | Pollack | |
| 6,543,683 B2 * | 4/2003 | Hoffman ....................... | 235/375 |
| 6,561,417 B1 | 5/2003 | Gadd | |

(Continued)

FOREIGN PATENT DOCUMENTS

| | | |
|---|---|---|
| CN | 1556962 A | 12/2004 |
| EP | 1209601 A2 | 5/2002 |

(Continued)

OTHER PUBLICATIONS

Office Action in Chinese Patent Application No. 200980122386.0, mail date Jul. 4, 2012, 7 pages.

(Continued)

*Primary Examiner* — Ryan Zeender
*Assistant Examiner* — Denisse Ortiz Roman
(74) *Attorney, Agent, or Firm* — Dave Ream; Jim Ross; Micky Minhas

(57) ABSTRACT

A receipt store may be provided as a service. Electronic payment receipts generated in any type of transaction may be delivered to the receipt store. A customer may subscribe to a particular receipt store, to be used as a repository for that customer's receipts. The customer may carry a device that is used to communicate payment information (such as a credit card number) to a device reader when purchases are made. The device may also identify the customer's receipt store. A commercial establishment that accepts the customer's payment may generate an electronic receipt, and may deliver it to the receipt store specified by the customer's device. The establishment may also deliver the receipt to the customer's device, and the customer's device may send the receipt along to the receipt store.

17 Claims, 10 Drawing Sheets

(56) References Cited

U.S. PATENT DOCUMENTS

| | | | |
|---|---|---|---|
| 6,804,704 B1 | 10/2004 | Bates et al. | |
| 6,832,244 B1 | 12/2004 | Raghunandan | |
| 7,039,389 B2 | 5/2006 | Johnson, Jr. | |
| 7,072,854 B2 | 7/2006 | Loeser | |
| 7,092,993 B2 | 8/2006 | Goldberg | |
| 7,158,948 B1* | 1/2007 | Rodriguez et al. | 705/28 |
| 7,174,366 B2 | 2/2007 | Chou | |
| 7,213,742 B1 | 5/2007 | Birch et al. | |
| 7,231,357 B1* | 6/2007 | Shanman et al. | 705/14.23 |
| 7,296,058 B2 | 11/2007 | Throop | |
| 7,376,583 B1* | 5/2008 | Rolf | 705/17 |
| 2002/0062351 A1 | 5/2002 | Oshima | |
| 2002/0087479 A1 | 7/2002 | Malcolm | |
| 2002/0174185 A1 | 11/2002 | Rawat et al. | |
| 2002/0188561 A1* | 12/2002 | Schultz | 705/40 |
| 2003/0055733 A1 | 3/2003 | Marshall et al. | |
| 2003/0110138 A1 | 6/2003 | Van Do et al. | |
| 2003/0182380 A1 | 9/2003 | Yabe et al. | |
| 2004/0034570 A1 | 2/2004 | Davis | |
| 2004/0236672 A1 | 11/2004 | Jung et al. | |
| 2005/0192992 A1 | 9/2005 | Reed et al. | |
| 2005/0246234 A1* | 11/2005 | Munyon | 705/21 |
| 2007/0061223 A1 | 3/2007 | Rodriguez et al. | |
| 2007/0069013 A1 | 3/2007 | Seifert et al. | |
| 2007/0136689 A1 | 6/2007 | Richardson-Bunbury et al. | |
| 2008/0043942 A1 | 2/2008 | Cardona et al. | |
| 2008/0235004 A1 | 9/2008 | Gago et al. | |
| 2009/0222353 A1* | 9/2009 | Guest et al. | 705/17 |
| 2009/0313101 A1 | 12/2009 | McKenna et al. | |

FOREIGN PATENT DOCUMENTS

| | | | |
|---|---|---|---|
| EP | 1244259 A1 | 9/2002 | |
| EP | 1557777 A1 | 7/2005 | |
| EP | 1571578 A1 | 9/2005 | |
| JP | 9218834 A | 8/1997 | |
| JP | 09251467 A | 9/1997 | |
| JP | 10055384 A | 2/1998 | |
| JP | 10177684 A | 6/1998 | |
| JP | 2002073948 A | 3/2002 | |
| JP | 2002304566 A | 10/2002 | |
| JP | 2003077064 A | 3/2003 | |
| JP | 2003091781 A | 3/2003 | |
| JP | 2004185443 A | 7/2004 | |
| JP | 2004295326 A | 10/2004 | |
| JP | 2006510968 A | 3/2006 | |
| JP | 2007505554 A | 3/2007 | |
| JP | 2008134683 A | 6/2008 | |
| KR | 1020050006628 A | 1/2005 | |
| KR | 1020060060985 A | 6/2006 | |
| KR | 1020070073005 A | 7/2007 | |
| RU | 2187150 C2 | 10/2002 | |
| RU | 2263959 C2 | 11/2004 | |
| RU | 2246757 C1 | 2/2005 | |
| WO | 0195170 A2 | 12/2001 | |
| WO | 03025699 A2 | 3/2003 | |
| WO | 03040941 A1 | 5/2003 | |
| WO | 2004055614 A2 | 7/2004 | |
| WO | 2004061698 A1 | 7/2004 | |
| WO | 2004086250 A1 | 10/2004 | |
| WO | 2005020016 A2 | 3/2005 | |
| WO | 2005027404 A1 | 3/2005 | |

OTHER PUBLICATIONS

Bystrom, et al., "BlueStar: A Bluetooth Financial Transaction System", 2002 IEEE Computer Society International Design Competition, Date: May 4, 2002, 30 Pages.

Gao, et al., "P2P-Paid: A Peer-to-Peer Wireless Payment System" Proceedings of the 2005 Second IEEE International Workshop on Mobile Commerce and Services, Date: Jul. 19, 2005, pp. 102-111.

Lee, et al., "A Payment & Receipt Business Model in U-Commerce Environment", Proceedings of the 8th international conference on Electronic commerce: The new e-commerce: innovations for conquering current barriers, obstacles and limitations to conducting successful business on the internet, Date: Aug. 14-16, 2006, pp. 319-324, Publisher: ACM New York, NY, USA.

"Digital Receipts for Local Transactions in Commercial Spaces", http://paginas.fe.up.pt/~ee02112/project/progressReport.html.

International Search Report and Written Opinion of the International Searching Authority, dated Feb. 16, 2010, Application No. PCT/US2009/041231, 11 pages.

International Search Report and Written Opinion of the International Searching Authority, dated Oct. 26, 2009, Application No. PCT/US2009/041236, 12 pages.

"E-mailUnlimited Professional," date: 2007, 7 pages, http://www.4officeautomation.net/emailunlimitedparsing.htm.

Choi Jin, "Design and Implementation of a Web-based Email System", Date: Jan. 2000, pp. 1-12, http://philip.greenspun.com/ancient-history/webmail/.

"Email2DB v1.9.290", Parker Software, date: Feb. 20, 2007, 3 pages, http://www.fileheap.com/software-email2db-download-23643.html.

Extended European Search Report (including Supplementary European search report and European search opinion), European Patent Application No. EP09763087 (MS# 323554.07), dated Jan. 15, 2013, 5 pages.

European Office Action in European Patent Application No. EP09763087 (MS# 323554.07), dated Sep. 25, 2013, 7 pages.

"Data Mining", Wikipedia, dated Jun. 11, 2008, 6 pages.

Office Action in U.S. Appl. No. 12/138,430 (MS# 323554.01), dated Sep. 28, 2010, 15 pages.

Office Action in U.S. Appl. No. 12/138,430 (MS# 323554.01), dated Apr. 26, 2011, 13 pages.

Office Action in U.S. Appl. No. 12/138,430 (MS# 323554.01), dated Dec. 9, 2013, 17 pages.

* cited by examiner

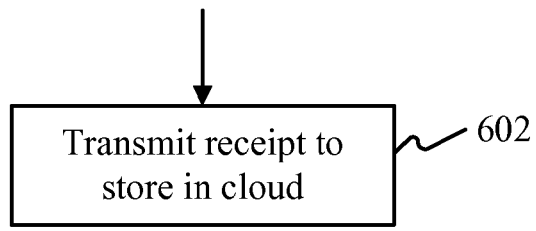
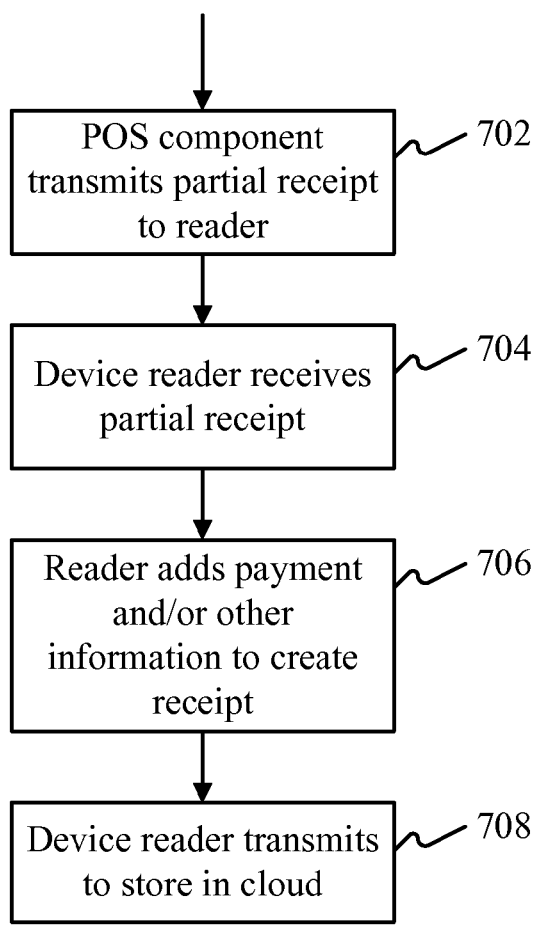

HANDLING PAYMENT RECEIPTS WITH A RECEIPT STORE

CROSS-REFERENCE TO RELATED CASES

This application is related to the commonly-assigned U.S. patent application Ser. No. 12/138,430 (U.S. patent application Pub. No. 2009/0313101), entitled "Processing Receipt Received in Set of Communications," filed on Jun. 13, 2008.

BACKGROUND

A transaction (e.g., a sale, a lease, a hotel reservation, a charitable donation, etc.) is often memorialized in the form of a receipt. Traditionally, receipts are issued on paper. Since the advent of e-commerce, transactions that occur on the web (e.g., retail purchases through web sites) have generated electronic receipts. When a transaction occurs over the web, a customer normally provides an e-mail address as part of the transaction, and the electronic receipt is sent to that e-mail address.

Electronic commerce has expanded beyond purchases through web sites. Modern cash registers are often implemented using software applications. Many items such as airline tickets, music, made-to-order sandwiches, etc., are sold through retail kiosks, which—like modern cash registers—are also implemented using software applications. The increasing use of computer systems to perform retail functions presents an opportunity to issue electronic receipts in cases where paper receipts traditionally have been issued.

A problem that arises when electronic receipts are issued outside of a web-site-purchase transaction is that it may be unclear where to deliver the receipt. Customers normally provide e-mail addresses when performing web transactions, so it is logical to e-mail the receipt to the customer. However, customers typically do not provide e-mail addresses when performing in-person transactions. Moreover, even if the customer does provide an e-mail address, there may be more convenient ways to handle a receipt than e-mailing it to the customer. The practice of e-mailing receipts may be a vestige of the dawn of e-commerce, when e-mailing the receipt to the customer was the only practical way to deliver an electronic receipt. Receipts could be handled in other ways that make use of the more sophisticated infrastructure, more powerful handheld devices, and greater connectivity.

SUMMARY

An electronic receipt may be generated based on a transaction, and the receipt could be delivered to a receipt store. The receipt store could be provided as a cloud service, and receipts could be sent into the cloud to be delivered to the receipt store. The customer could then access his or her receipts through the receipt store.

A commercial establishment (e.g., a retail store, a hotel, etc.) could be configured with a point of sale component (such as a cash register) connected to a device reader. The customer may carry a device that stores a profile for that customer. The profile may include payment information (such as a credit card number or other account number), and may also include contact information indicating the location of a receipt store to which the customer's receipts are to be sent. The device reader may read the profile information from the customer's device. The receipt may be sent to the receipt store specified in the customer's profile.

Sending of the receipt could be accomplished in a variety of ways. For example, a cash register or other point of sale component could send the receipt into the cloud for delivery to the customer's specified receipt store. Or, the device reader could generate and/or send the receipt to the receipt store through the cloud. As yet another option, the device reader could engage in two-way communication with the device and could provide the receipt directly to the device. The device could then send the receipt into the cloud for delivery to the customer's receipt store, while also leaving on the customer's device the copy of the receipt that was generated at the time of the transaction.

The receipt may contain any level of detail about the transaction. For example, in certain credit card transactions, line-item levels of detail about the transaction are provided to the credit card issuer, and the availability of this data could be leveraged to provide a highly detailed receipt to the customer. The customer could then access this level of detail through the receipt store.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6-8 are flow diagrams of some example ways to continue the process of FIG. 5, based on which component sends a receipt to a receipt store.

DETAILED DESCRIPTION

Receipts, and other kinds of transaction records, have traditionally been issued in paper form. Since the advent of e-commerce, many receipts for on-line transactions have been issued in electronic form. It is de rigueur for a purchaser in an on-line transaction to provide an e-mail address, so it is natural to send a receipt for an on-line transaction to the purchaser's e-mail address. However, the model of collecting the purchaser's e-mail address, and e-mailing a receipt to that address, may not generalize well to transactions outside of the web setting. People are not accustomed to providing e-mail addresses during in-person transactions. Also, the equipment and software that is used to support in-person transactions is not normally set up to generate receipts and e-mail them to customers.

Moreover, receiving a receipt by e-mail at the customer's normal correspondence address may not be a particular convenient way to receive a receipt. The practice of e-mailing receipts to customers may be a vestige of the early days of e-commerce, and modern technologies could be used to provide receipts in other ways. The development of cloud computing models suggests ways that electronic receipts could be directed to a customer without necessarily e-mailing them to the customer's normal correspondence inbox. For example, a customer could carry a device that can communicate the customer's payment information to a payment device at a retail establishment such as a restaurant, music store, airline kiosk, etc. The customer's device might be the customer's wireless telephone or handheld computer. That device could store the customer's credit card number to be used for payment, and the customer could pay by swiping the device in front of a device reader. In such a scenario, e-mailing a receipt to the customer's normal correspondence address seems awkward and somewhat dissonant with the in-person character of the transaction. The subject matter described herein provides various mechanisms that could be used to deliver receipts or other transaction records to various locations, such as a receipt store. The customer could access his or her receipts through the receipt store, and could be given access to arbitrary levels of detail about the transaction (e.g., a line-by-line accounting of what the customer purchased). These mechanisms could be used for in-person transactions, but could also be used as a way to deliver receipts in web transactions or other on-line transactions.

Figure 1:
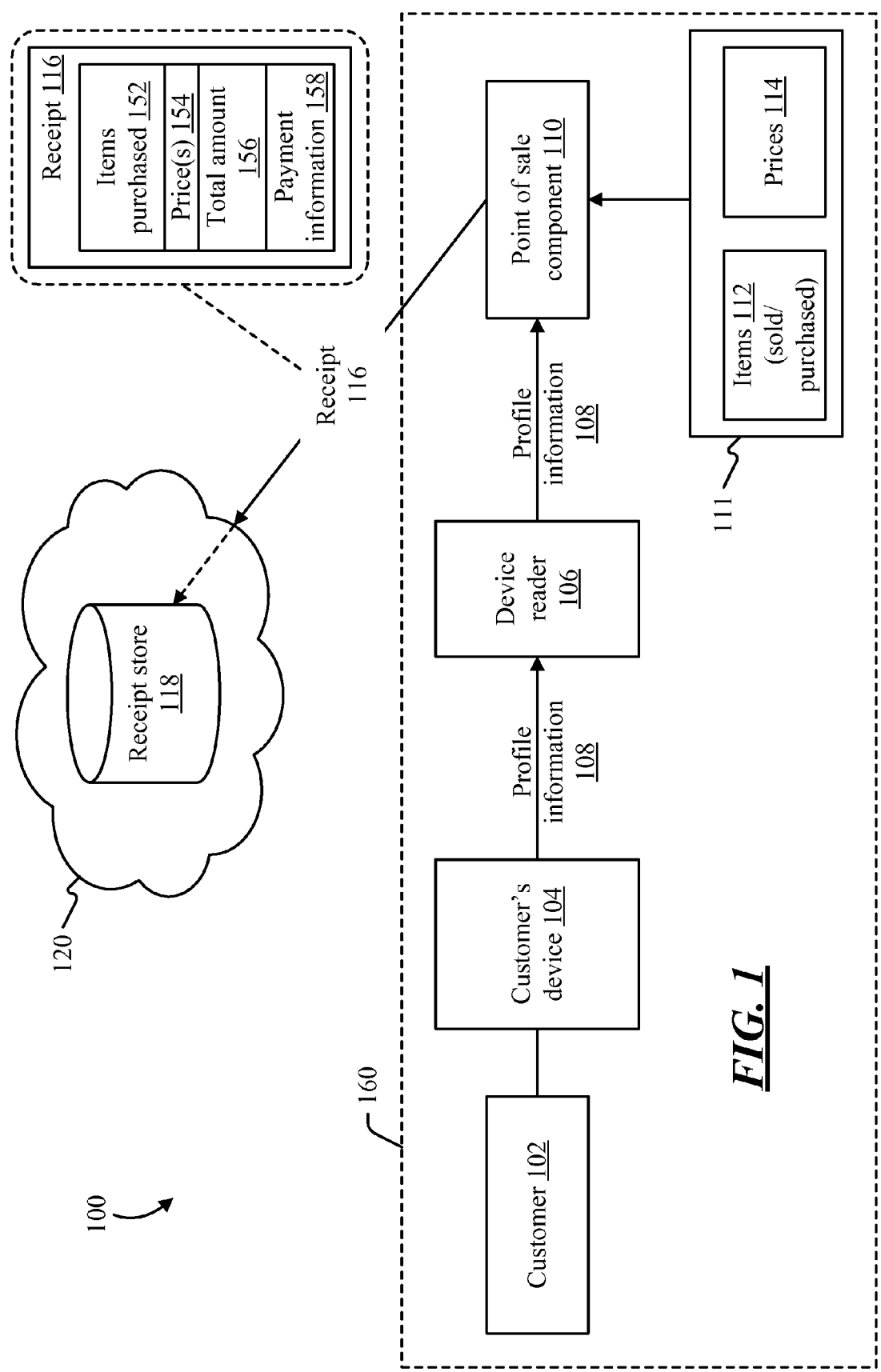
FIGS. 1-3 are block diagrams of example systems in which a receipt may be generated and delivered to a receipt store.

Turning now to the drawings, FIG. 1 shows an example system 100 in which a receipt may be generated and delivered to a receipt store. Customer 102 is a customer who engages in a transaction. For example, customer 102 may be purchasing a good or service at a retail establishment at which he or she is physically present. Any type of good or service could be involved. For example, customer 102 could be purchasing groceries at a supermarket, video equipment at an electronics store, music at a kiosk in a cafe, a meal at a restaurant, medical services from a doctor's office, etc. Other types of transactions might include making a hotel or rental car reservation, making a charitable donation, etc. The foregoing are examples, although any type of transaction could be performed.

Figure 10:
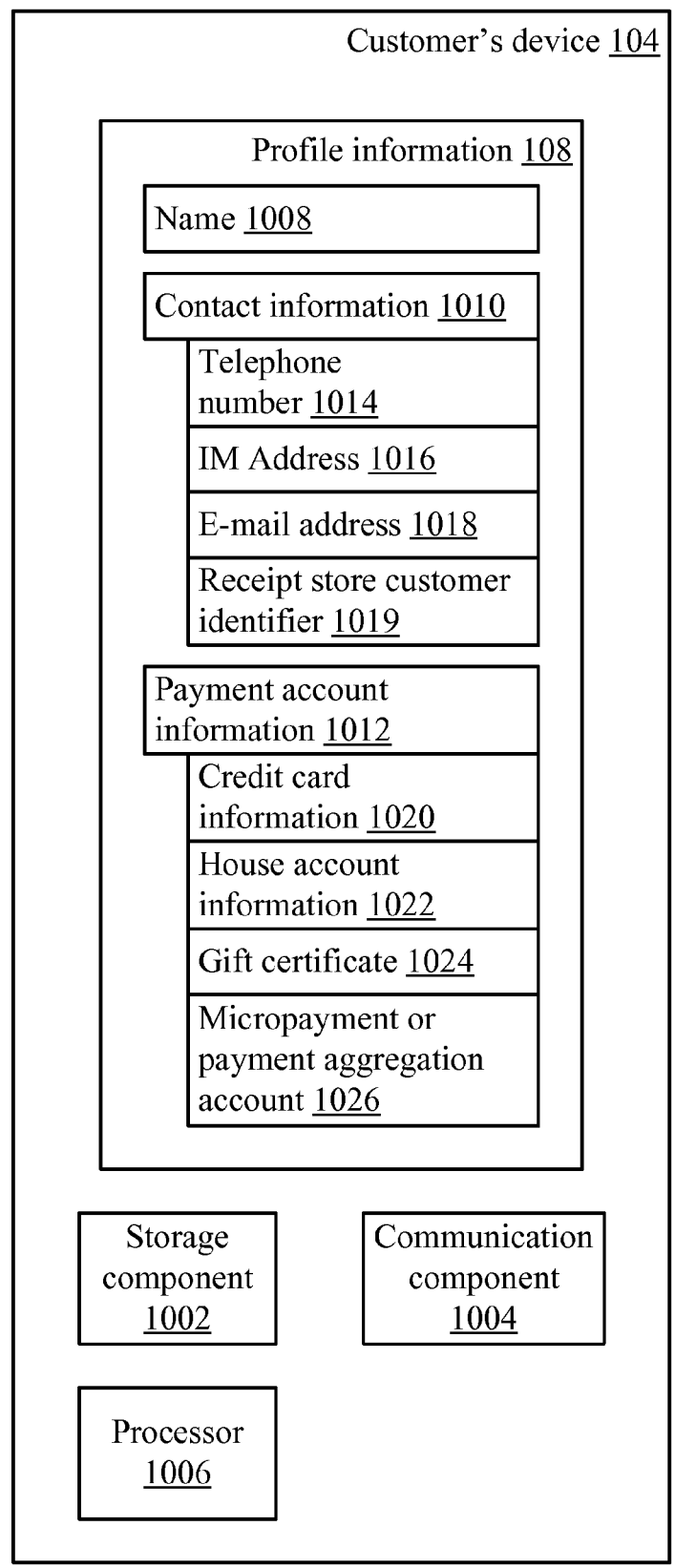
FIG. 10 is a block diagram of an example customer device.

Customer 102 may be in possession of, or may otherwise be associated with, device 104. Device 104 may hold, in electronic form, a profile of customer 102. The profile may include various information that customer 102 could use to engage in a transaction. For example, device 104 may hold credit card information or other account information that customer 102 uses to pay for a purchase. Device 104 could be a wireless telephone, a personal digital assistant, a smartcard, or any other type of device. Device 104 may have components that store the information mentioned above, and may also have components that communicate this information to an appropriate type of device reader. Example components of device 104, and example information that device 104 could hold, are shown in FIG. 10 and are discussed below in connection with that figure.

Device reader 106 is a component that is used to read information that device 104 communicates. For example, device reader 106 could read devices that meet the International Organization for Standardization (ISO) 14443 standard for proximity cards, or devices that use Near Field Communication (NFC) technology. In one example, device 104 is customer 102's wireless telephone, which is equipped with NFC technology, and customer 102 "swipes" the telephone within a few inchers of reader 106 so that device reader 106 can read information from device 104. However, the foregoing are merely examples, and device reader 106 could read any type of device using any type of technology or communication mechanism.

Profile information 108 is information stored by device 104. Profile information may include customer 102's name, credit card number, or any other information. Specific examples of such information are discussed below in connection with FIG. 10. Device 104 communicates profile information 108 to device reader 106.

In an example transaction scenario, a purchase is accomplished through a plurality of different components, including device reader 106 and point-of-sale (POS) component 110. POS component 110 may be a cash register, a retail kiosk, a computer, or any other type of device or system that could be used to facilitate a sale. Typically, POS component 110 is used for transactions where the customer is physically present at the location where the transaction occurs—e.g., in the case of a bricks-and-mortar store, a restaurant, etc. A scenario of physical presence is in contrast to an Internet purchase/e-commerce scenario, or other scenario where a remote transaction is performed over a network. Thus, FIG. 1 shows, in one example, various elements together at the same physical location 160 (as indicated by the dotted-line enclosure). For example, if POS component 110 is a cash register, then items that are being purchased/sold, and prices of those items, could be entered into POS component 110. Entry could occur through a keyboard, a barcode scanner, or any other kind of mechanism. If POS component 110 is a retail kiosk that vends music, then POS component 110 could be used to select music, and possibly to transfer purchased music to customer 102's music-rendering system. (Device 104 might be customer 102's music-rendering system—e.g., in the case where device 104 is an MP3 player or some other device with music-rendering capability.) In one example, device reader 106 and POS component 110 are separate components that are attached to each other. In another example, device reader 106 is built into POS component 110.

FIG. 1 shows POS component 110 receiving indications 111 of the items 112 that are being sold/purchased, and/or the prices 114 of those items. Indications of items 112 and prices 114 could be received by POS component 110 in any manner. (In this example, "items" could refer to goods, services, food and beverages on a restaurant menu, or anything else that could be the subject of a transaction.) For example, POS component 110 might be connected to a database that contains a catalog of items that are available for sale, and the prices of those items. Thus, the indications of which items are being purchased could be entered through a keyboard, scanner, touch-screen, etc. and the prices could be looked up in the database. Or, in the example where POS component 110 is a cash register, a cashier could enter prices 114 into the cash register. POS component 110 may receive indications of items 112 to be sold/purchased and/or prices 114, and the foregoing are merely some examples of how POS component 110 could receive this information.

When POS component 110 completes a transaction, it generates a receipt 116. (As discussed below in connection with FIGS. 2 and 3, POS component 110 could also generate a partial receipt, with payment information to be added by device reader 106 when payment is collected from customer 102.) Receipt 116 may include, for example, information about items purchased 152, the price(s) 154 of the items, a total monetary amount 156 of the items purchased, payment information 158 (e.g., how much paid for the purchase, and what form of payment), or any other type of information.

Receipt 116 may be sent to a receipt store 118. Receipt store 118 may be accessible via a network, such as the Internet. Moreover, receipt store 118 may be provided through a cloud computing model, in which receipt store 118 is a service that is deliverable from cloud 120. As is generally understood, cloud 120 refers to a collection of functionality and/or services that are provided by remote devices and software, and interacted with via a network. Receipt store 118 may receive receipt 116, and may perform various actions with respect to receipt 116. Examples of actions that could be performed with respect to receipt 116 are discussed below in connection with FIG. 9.

Figure 2:
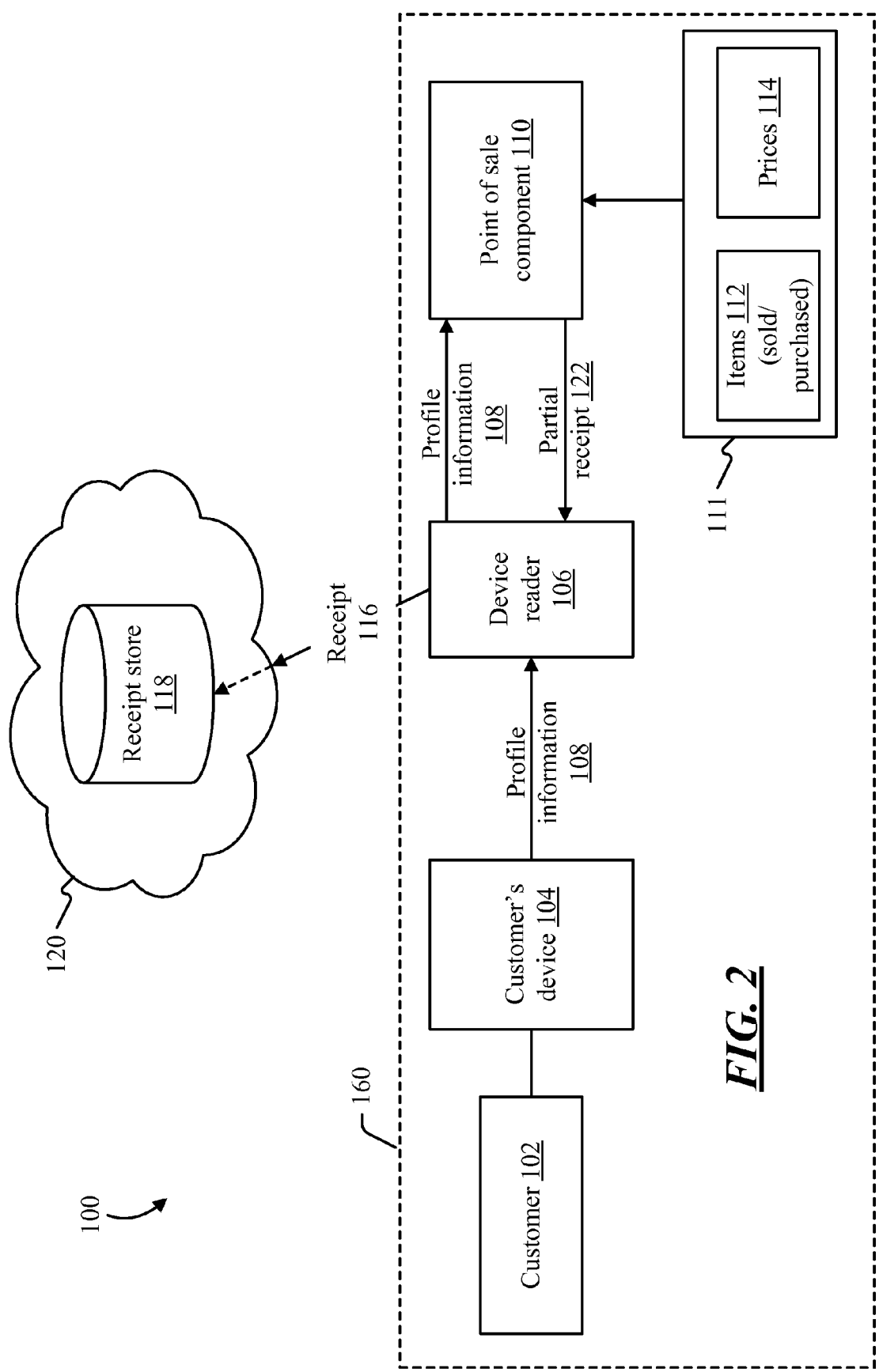
Figure 3:
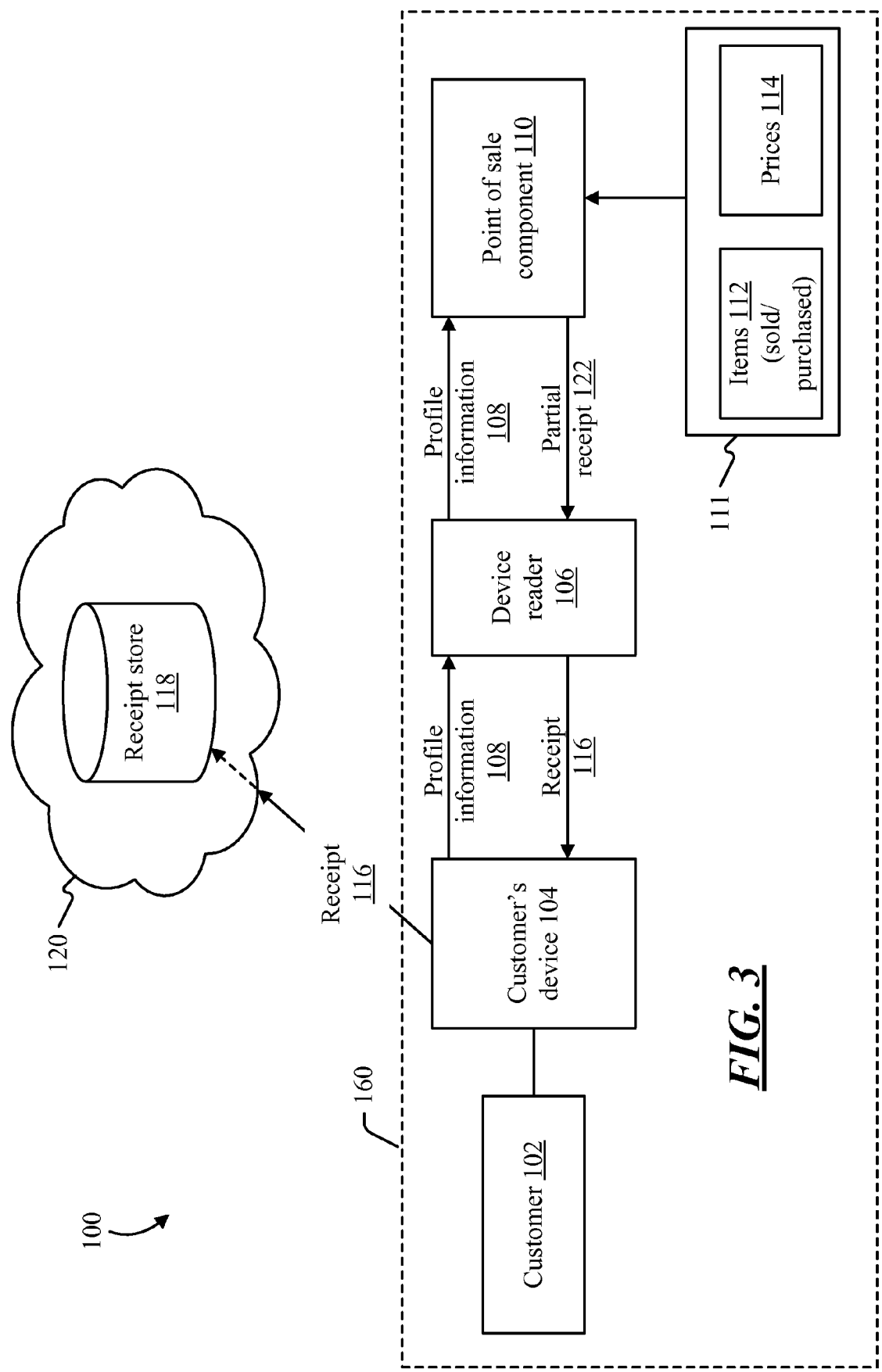

A component of system 100 may send receipt 116 into cloud 120 to be delivered to receipt store 118. (Sending a receipt through cloud 120 is shown as an example, although receipt 116 could also be sent to receipt store 118 in a manner that does not involve cloud 120.) Receipt 116 could be sent to receipt store 118 by various components of system 100. FIG. 1 shows an example in which POS component 110 sends receipt 116 to receipt store 118. However, receipt 116 could be sent by other components of system 100. FIGS. 2 and 3 show examples in which receipt 116 is sent to receipt store 118 by other components of system 100.

FIGS. 2 and 3 show examples in which components of system 100, other than POS component 110, are used to send a receipt to a receipt store. (In FIGS. 2 and 3, numerals 100, 102, 104, 106, 108, 110, 111, 112, 114, 116, 118, 120, and 160 refer to the same elements as in FIG. 1. In FIGS. 2 and 3, receipt 116 may have the same example detail shown in FIG. 1 with numerals 152, 154, 156, and 158, although—in order to simplify the illustrations—this detail is not repeated in FIGS. 2 and 3.) In FIG. 2, POS component 110 generates a partial receipt 122. Partial receipt 122 may include the information contained in receipt 116 of FIG. 1, but without the payment information. The payment information could be inserted by device reader 106 to reflect customer 102's payment after POS component 110 has ascertained what is being purchased and the amount to be paid. Partial receipt 122 could take the form of a receipt with the payment information omitted, or it could be some other representation of the items purchased and/or total amount, which could then be used by device reader 106 to generate a receipt in an appropriate form after payment has been received. (A receipt could also be generated at another time, such as before payment has been received.) Device reader 106 receives partial receipt 122, and then generates receipt 116. After receipt 116 has been generated, device reader 106 sends receipt 116 to receipt store 118 (possibly through cloud 120, as in FIG. 1). (By way of terminology, partial receipt 122 and receipt 116 are both examples of content that relates to a transaction.)

In FIG. 3, POS component 110 also receives sends partial receipt 122 to device reader 106. Device reader 106 may then add payment information to partial receipt 122 in order to generate receipt 116. Device reader 106 may also send receipt 116 to customer's device 104. Customer's device 104 may be configured to send receipt 116 to receipt store 118 (again, possibly through cloud 120, as in FIGS. 1 and 2). Example processes by which receipts are handled in these various scenarios are shown in FIGS. 5-8 and are discussed below. (The reference to partial receipt 122 in the discussion of FIG. 3 is merely an example; rather than having the receipt generated in stages, POS component 110 could instead generate the full receipt.)

The sending of receipt 116 to receipt store 118 from various different components of system 100 supports various different technological and business models. For example, in some cases POS component 110 can collect a list of items purchased and add up the total amount of a sale, but is not in a position to generate a full receipt because it does not have payment information. Moreover, some POS components (e.g., some cash registers) employ proprietary technologies and/or closed platforms, and thus are difficult to retrofit with the software that would be used to generate a receipt in an appropriate format and to send that receipt to a receipt store 118 in cloud 120. For these reasons, it may make sense to have receipt 116 sent to receipt store 118 by device reader 106 or by customer's device 104, rather than by POS component 110. (The business models on which device readers are built and distributed may make them more amenable to being fitted with the appropriate software to generate and transmit a receipt.)

On the other hand, in some cases POS component 110 does have access to payment information and can be fitted with the appropriate software to send receipts to a receipt store. For example, a large retail chain may implement and manage its own POS system, and may give that POS system access to a back-end system that collects payments from customers. In such a case, the POS system could be fitted with software to send receipts to receipt store 118 and would have access to payment information. Therefore, in such a case, POS component 110 could generate receipt 116 and send it to receipt store 118.

When POS component 110 is not the component used to send receipt 116 to receipt store 118, the receipt could be sent by device reader 106 or by customer's device 104. In the scenario of FIG. 3, device reader 106 provides receipt 116 to customer's device 104, which then sends receipt 116 to receipt store 118. In this scenario, customer's device 104 receives receipt 116, thus making receipt 116 available on customer's device 104 at the time of the transaction. Customer's device 104 may then send receipt 116 to receipt store 118 when network connectivity is available to device 104. Since customer 102 may use device 104 as a general purpose repository of personal and business information, it may be convenient for customer 102 to have a copy of receipt 116 on device 104. However, providing the receipt to customer's device at the time of the transaction normally involves two communication sessions between device reader 106 and customer's device 104: one to collect profile information 108 in order to make payment and another to receive receipt 116 after receipt 116 has been generated. These two communication sessions, in practice, normally involve customer 102's swiping device 104 twice. Having device reader 106 send receipt 116 to receipt store 118 (as in the scenario of FIG. 2) avoids the second swipe. Receipt 116 may later be transmitted from receipt store 118 to device 104 using normal network connectivity available on device 104. However, in this scenario, customer 102 may have to wait to receive receipt 116 until it can be delivered from receipt store 118—which may take time if, for example, network connectivity is not available to device 104 at the time of the transaction.

FIGS. 4-8 show various processes. Before turning to a description of FIGS. 4-8, it is noted that the flow diagrams contained in those figures are described, by way of example, with reference to components shown in FIGS. 1-3, although these processes may be carried out in any system and are not limited to the scenarios shown in FIG. 1-3. Additionally, each of the flow diagrams in FIGS. 4-8 shows an example in which stages of a process are carried out in a particular order, as indicated by the lines connecting the blocks, but the various stages shown in these diagrams can be performed in any order, or in any combination or sub-combination.

Figure 4:
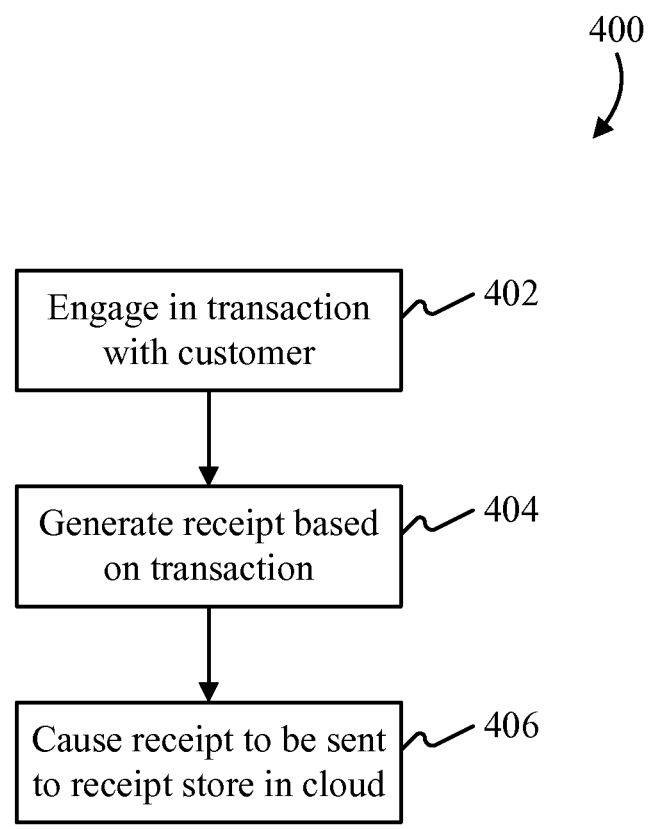
FIG. 4 is a flow diagram of an example process in which a transaction with a customer occurs and in which a receipt is sent to a receipt store.

FIG. 4 shows an example process 400 in which a transaction with a customer occurs and in which a receipt is sent to a receipt store. At 402, a transaction is engaged in with a customer. For example, in system 100 (shown in FIGS. 1-3), customer 102 may engage in a purchase transaction using components such as device 104, device reader 106, and POS component 110 (also shown in FIGS. 1-3). At 404, a receipt is generated based on the transaction. A receipt could be generated by a POS component, a device reader, etc. At 406, the system causes the receipt to be sent to a receipt store in the cloud. The act of causing a receipt to be sent to a receipt store could take various forms, since the receipt could be sent from various components. For example, as noted above, a receipt could be sent from a POS component, a device reader, or a customer's device.

Figure 5:
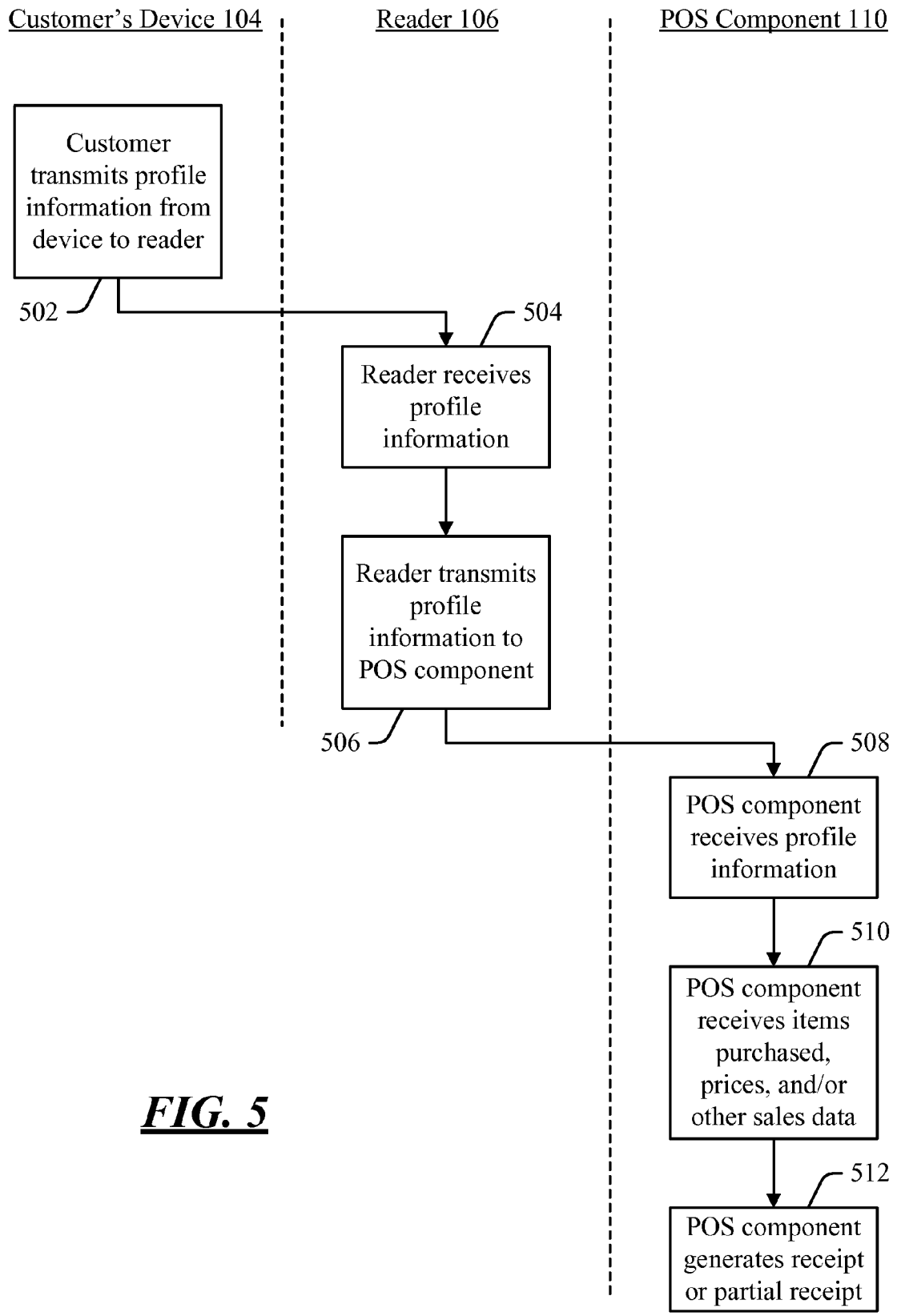
FIG. 5 is a flow diagram of an example process in which a transaction is performed and a receipt, or part of a receipt, is generated.

FIG. 5 shows an example process in which a transaction is performed, and in which a receipt (or part of a receipt) is generated. The columns in FIG. 5 (as shown by the vertical dotted lines marking separate columns) indicate particular components of FIGS. 1-3 (Customer's device 104, reader 106, and POS component 110) at which particular stages of the process could be performed. However, the stages shown could be performed using any components (whether or not those components are shown in FIGS. 1-3).

At 502, a customer uses a device to transmit profile information from a device to a reader. For example, the customer's name, account number, contact information, etc, could be stored on the customer's handheld wireless telephone. This information could be transmitted to a device reader. The transmission could be performed using any sort of data transmission technology, such as NFC technology, WiFi, Bluetooth, optical barcode, etc.

At 504, the reader receives the profile information transmitted by the device. The reader then transmits the profile information to a POS component (at 506). For example, a device reader could be wired to a POS component, and may act as an interface that relays information between the device and the POS component. Thus, if the device reader receives profile information from a customer's device, the device reader may provide this information to the POS component.

At 508, the POS component receives the profile information. At 510, the POS component receives an indication of items being purchased by the customer, prices to be paid, or other sales data. For example, POS component may be a cash register that receives indications of which items are to be purchased through a barcode scanner, and looks up prices of those items in a database. Or, the cash register could just receive the total amount to be paid (as might occur at a restaurant, where a cashier enters the amount of the final check into the cash register). As another example, POS component could be a kiosk that sells music, airline tickets, or anything else, in which case the kiosk could receive indication of items to be purchased directly from the customer while the transaction is being performed. The foregoing are some examples of how the POS component might receive indications of items to be purchased, their prices, and/or other sales data, although this information could be received in any manner.

At 512 POS component generates a receipt or a partial receipt for the transaction. As noted above, depending on the context in which a POS component is deployed, the POS component might generate a full receipt for a transaction. Or, it might generate a partial receipt containing some of the information to be used in a receipt (where a partial receipt could, for example, contain the information that would be used in a receipt, minus the payment information to be collected through a device reader).

Figure 8:
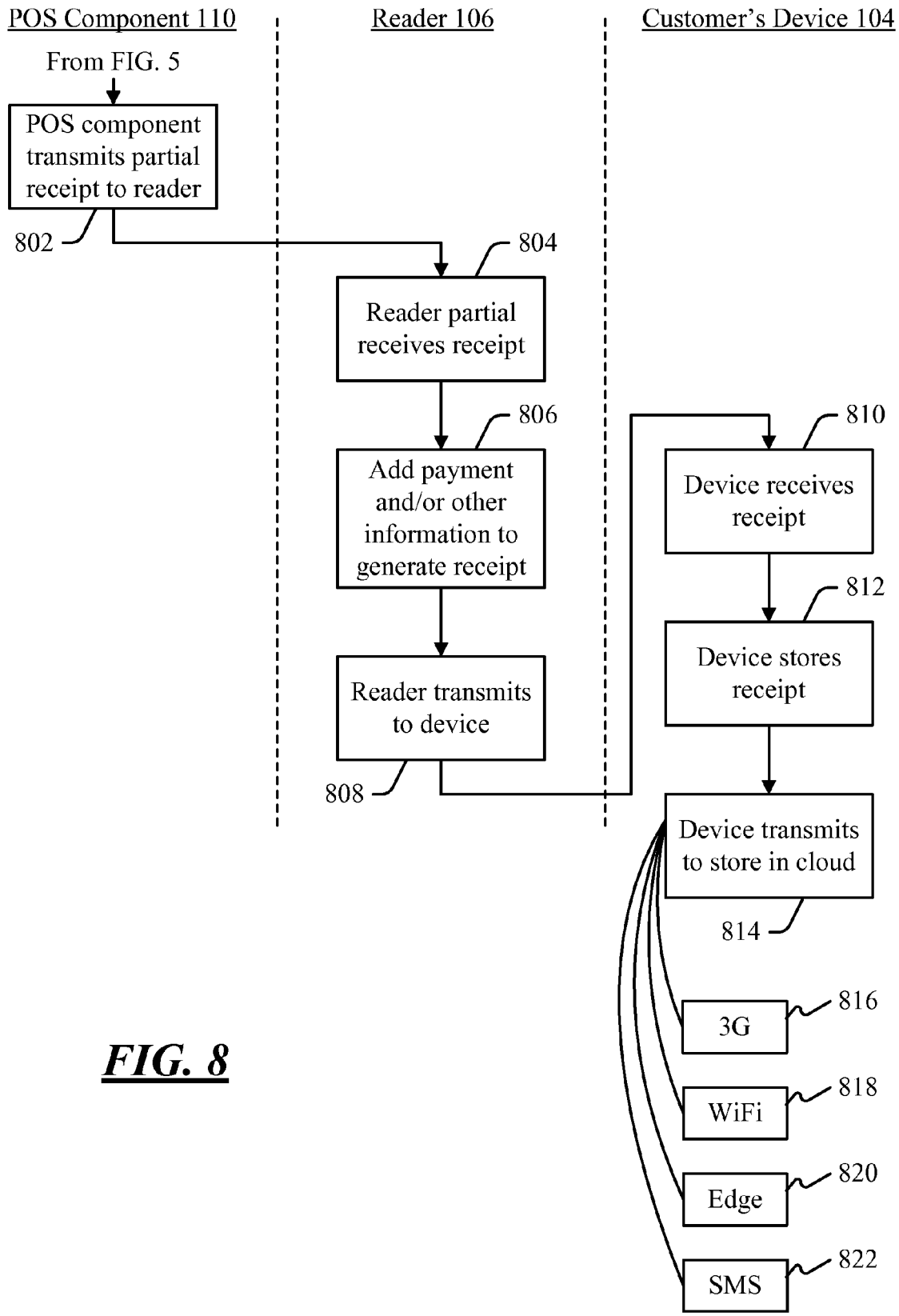

The process shown in FIG. 5 may continue to FIGS. 6, 7, or 8, depending on how the receipt is to be delivered to a receipt store.

FIG. 6 shows an example stage that may be performed if the receipt is to be sent to the receipt store from a POS component. Since the receipt has been generated by the POS component, at 602 the receipt is simply transmitted from the POS component to the receipt store in the cloud.

FIG. 7 shows example stages that may be performed if the receipt is to be transmitted from a device reader to the receipt store. At 702, the partial receipt generated by the POS component is transmitted to the device reader. At 704, the device reader receives the partial receipt from the POS component. At 706, the device reader adds payment information and/or other information to the partial receipt to create the full receipt. At 708, the device reader transmits the receipt to the receipt store in the cloud. The stages in FIG. 7 could be performed using the POS component and device reader as indicated, but could also be performed using other and/or additional components. For example, a receipt printer could be connected to one or more of the above-mentioned components. The receipt printer could print paper receipt and might also be able to send receipts to a cloud (regardless of whether the printer prints paper receipts). Moreover, a separate device could perform the sending of receipts to the cloud, regardless of whether that device is also a paper printer.

FIG. 8 shows example stages that may be performed if the receipt is to be transmitted from the customer's device (e.g., from the customer's wireless telephone) to the receipt store. At 802, POS component 110 transmits a partial receipt to device reader 106. At 804, the reader receives the partial receipt. At 806, the device reader then adds payment information and/or other information to the partial receipt to create the full receipt. At 808, the device reader transmits the receipt to the customer's device. At 810, customer's device 104 receives the receipt. At 812, the customer's device may store a copy of the receipt within its own memory or storage device. At 814, the customer's device transmits the receipt to the receipt store in the cloud. Transmission of the receipt from the customer's device to the receipt store may use any mechanism. For example, if the customer's device is a wireless telephone, then the receipt could be transmitted using the various technologies that are available for transmitting information to or from a wireless telephone—e.g., 3G 816, WiFi 818, Enhanced Data rates for GSM Evolution (EDGE) 820, Short Message Service (SMS) 822, or any other mechanism.

Figure 9:
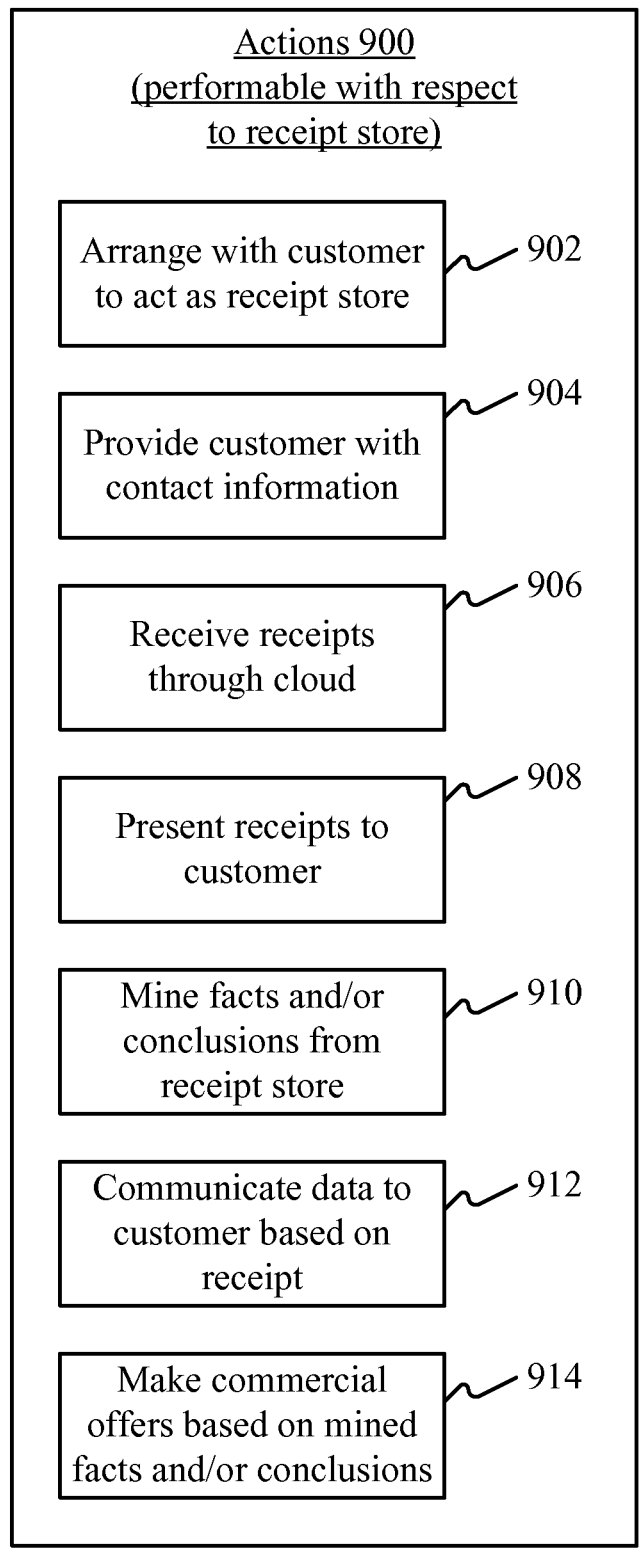
FIG. 9 is a block diagram of some example actions that could be performed with respect to a receipt store.

Receipt store 116 could be a repository in which the receipts of customer 102 are stored. (Receipt store 116 and customer 102 are shown in FIGS. 1-3.) Various actions could be performed to set up a receipt store for a customer, and/or to use the receipts in the store. FIG. 9 shows some example actions 900 that could be performed with respect to a receipt store.

One such action that could be performed is for a provider of a receipt store to arrange with a particular customer to act as that customer's receipt store (block 902). For example, a third-party on-line service provider could offer a receipt store as a cloud service to which a customer could subscribe. A customer could then subscribe to this service, whereupon the provider would agree to serve as the customer's receipt store. The provider could (at block 904) give the customer contact information (e.g., an e-mail address, an Instant Message (IM) address, a Uniform Resource Locator (URL), a phone number, an SMS identifier, an arbitrary string of characters that the store associates with a particular customer but that is not decipherable by members of the general public such as spammers, etc.) that the customer could use to direct receipts to. This contact information, obtained by the customer from the receipt store provider, could be stored in customer's device 104 (shown in FIGS. 1-3). This contact information could serve as a form of customer identifier, which could be included in or otherwise associated with a receipt; the contact information may identify the customer in the sense that the customer may be associated with the particular contact information that is used to send receipts to his or her receipt store. (However, other types of contact information could be included in a receipt.)

While a receipt store is described above as a third-party service, a customer could provide his or her own receipt store, such as by running receipt-store software on his or her own network-connected computer, so that the receipts may be received and stored on the customer's own computer.

After a receipt store has begun to receive receipts for a customer (block 906), various actions could be performed with respect to those receipts. For example, the customer could request to see the receipts, and the receipts could be presented to the customer (block 908). As another example, receipts contain various types of facts (e.g., what type of items the customer has purchased, how much money the customer has spent, etc.), and those facts, as well as conclusions from those facts, could be mined from the receipt store (block 910). For example, if the customer made a recent purchase at a particular camera store for $100, this fact is a basic fact that can be mined from the customer's receipts. If the customer makes frequent purchases at camera stores, then a conclusion that might be mined is that the customer has an interest in photography. The foregoing are examples of facts and conclusions about a particular customer that could be mined from the customer's receipts. However, since a receipt store may store receipts for many different customers, facts and conclusions that span different customer's receipts (or even receipts that are anonymous, or for which the association between the customer and the receipt is not readily discernible) could also be mined. For example, if the receipts collected across all customers for a month show that purchases of a particular item are accelerating among purchasers in the 18-24-year-old range, then one could mine the conclusion that this particular item is becoming the next "fad." The subscription agreement between the receipt store provider and the customer might include authorization to have the customer's receipts analyzed, so that these kinds of facts and conclusions could be mined from customer receipts.

Another action that could be performed is to communicate, to the customer, data based on the receipt (block 912). The mined facts and/or conclusions are examples of data that could be based on a receipt. The receipts themselves are also examples of such data. For example, a receipt store provider could have some type of software that displays mined facts and/or conclusions in the form of a dashboard (or that otherwise presents or communicates these mined facts and/or conclusions to a person). The software might allow the provider to query for certain kinds of facts or conclusions (e.g., What is the most popular song purchased in the last month by 18-24-year-olds in the Seattle area? Or, what restaurant is most popular among employees of XYZ Corporation?).

A further action that could be performed is to make commercial offers based on the mined facts and/or conclusions (block 914). For example, if a customer has purchased an item at a particular store, then the customer could be sent a coupon or discount for that store as a loyalty incentive. Or, if the customer's purchases reflect an interest in skiing, then a coupon could be sent to the customer for a ski shop that would like to do business with the customer.

As noted above, a customer's device 104 (shown in FIGS. 1-3) may store, and may be able to transmit, various profile information about the customer. FIG. 10 shows an example of a customer's device 104, with various example profile information 108 and components that could be used to store and/or communicate that information.

Customer's device 104 may, for example, be a wireless telephone, handheld computer, smartcard, or any other type of device. Device 104 may have a storage component 1002, such as a flash memory, a read-only memory, a volatile memory, a disk, etc. Device 104 may also have a communication component 1004, which device 104 may use to engage in one-way or two-way communication with the world outside of device 104. For example, communication component 1004 may comprise a wired or wireless network interface, a serial or parallel port, an antenna, or any other type of communication component(s), either alone or in combination with each other. Device 104 may also comprise a processor 1006, which device 104 uses to execute instructions. The instructions could be stored in storage component 1002 and/or received through communication component 1004.

Profile information 108 may be stored in storage component 1002. FIG. 10 shows examples of various types of information that could be included in profile information 108. The specific information shown in FIG. 10 is an example, but profile information 108 could comprise any type of information. Moreover, when device 104 communicates profile information 108, the information communicated could include all of the profile information that device 104 stores for a customer, or could be some subset of that information (or a convolution of the information, such as a hash).

Profile information 108 may include a customer's name 1008, contact information 1010, and payment account information 1012. The name could be represented as a text string (e.g., "John A. Smith"). Contact information 1010 could include any type of contact information, such as a telephone number 1014 (e.g., the telephone number of device 104, if device 104 functions as a telephone), an IM address 1016, an e-mail address 1018, a receipt store customer identifier 1019, or any other type of contact information. One or more pieces of contact information could identify locations to which the customer's receipts are to be sent. For example, if the customer subscribes to a receipt store service, and that service provides the customer with a location to which receipts are to be sent such as an e-mail address (or IM address, SMS address, URL, etc.), then that location could be included among contact information 1010. In one example, the location to which receipts are to be sent, as identified by contact information 1010, may be a location other than the customer's general inbox that the customer uses to receive correspondence. (It might be the case that correspondence would occasionally be sent to the receipt store; the fact that such correspondence might be directed to the receipt store does make the receipt store a correspondence address, and does not make the receipt store the customer's normal correspondence inbox.)

Payment account information 1012 may identify various types of accounts that could be used to pay for a customer's purchases. This information might include credit card information 1020 (e.g., the account number, expiration date, and card security number of a particular Visa card), house account information 1022 (e.g., an account number for an in-store account), a gift certificate 1024, a micropayment or payment aggregation account 1026 (such as an e-mail address and passwords that allow payments to be made from the customer's PayPal account), or any other type of account information.

Figure 11:
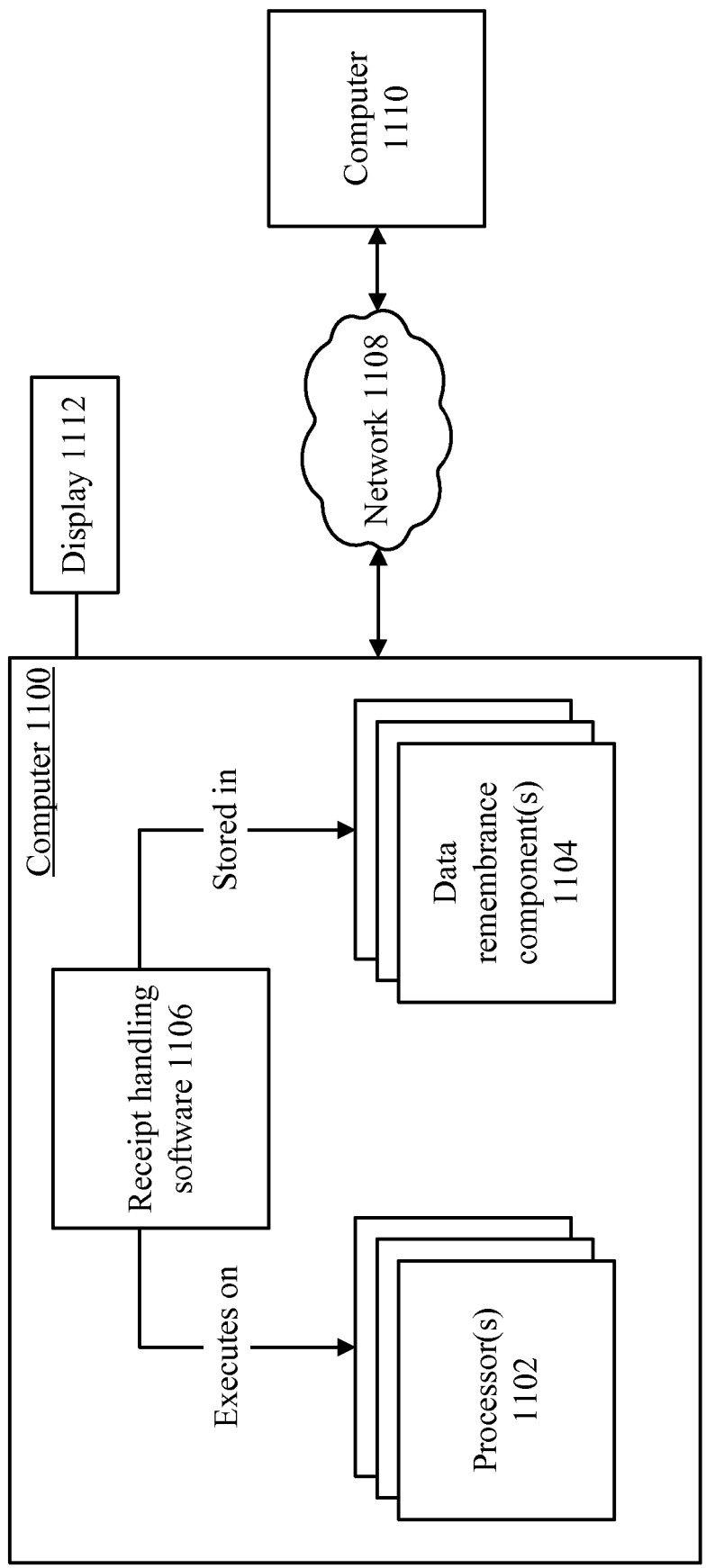
FIG. 11 is a block diagram of example components that may be used in connection with implementations of the subject matter described herein.

FIG. 11 shows an example environment in which aspects of the subject matter described herein may be deployed.

Computer 1100 includes one or more processors 1102 and one or more data remembrance components 1104. Processor(s) 1102 are typically microprocessors, such as those found in a personal desktop or laptop computer, a server, a handheld computer, or another kind of computing device. Data remembrance component(s) 1104 are components that are capable of storing data for either the short or long term. Examples of data remembrance component(s) 1104 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 1100 may comprise, or be associated with, display 1112, which may be a cathode ray tube (CRT) monitor, a liquid crystal display (LCD) monitor, or any other type of monitor.

Software may be stored in the data remembrance component(s) 1104, and may execute on the one or more processor(s) 1102. An example of such software is receipt handling software 1106, which may implement some or all of the functionality described above in connection with FIGS. 1-10, although any type of software could be used. Software 1106 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 11, although the subject matter described herein is not limited to this example.

The subject matter described herein can be implemented as software that is stored in one or more of the data remembrance component(s) 1104 and that executes on one or more of the processor(s) 1102. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 1100 may be communicatively connected to one or more other devices through network 1108. Computer 1110, which may be similar in structure to computer 1100, is an example of a device that can be connected to computer 1100, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing a receipt, the method comprising:
engaging in a point-of-sale transaction with a customer in which said customer is physically present at a location at which the transaction occurs, said transaction not being performed through a commerce system that facilitates remote network transactions;
receiving, from a device carried by said customer, profile information that is stored on said device and that comprises contact information that identifies, by an e-mail address, an Instant Message (IM) address, a Uniform Resource Locator (URL), a phone number, or a Short Message Service (SMS) identifier, a location to which said receipt is to be sent, said profile information being received at a device reader that communicates with said device and that is communicatively connected to a point-of-sale component and that is separate from said point-of-sale component;
generating said receipt based on said transaction by creating, at said point-of-sale component, a partial receipt that does not include an amount paid by said customer for transaction and does not include a form of payment used for said transaction, and by transmitting said partial receipt to said device reader, said device reader creating said receipt from said partial receipt by said device reader's adding said amount paid and said form of payment to said partial receipt; and
causing said receipt to be sent, via a network, to a receipt store identified by said contact information, wherein said receipt store is remote from said location at which said transaction occurs.

2. The method of claim 1, wherein said profile information is received at said device reader, and wherein said causing comprises:
transmitting said receipt from said point-of-sale component to said receipt store without transmitting said receipt to said device reader.

3. The method of claim 1, wherein said causing comprises:
transmitting said receipt to said receipt store from said device reader.

4. The method of claim 1, further comprising:
transmitting said receipt from said device reader to said device; wherein said causing comprises:
transmitting said receipt to said receipt store from said device.

5. The method of claim 4, further comprising:
storing a copy of said receipt to said device.

6. The method of claim 1, wherein said receipt store is implemented as a service in a cloud, and wherein said causing comprises:
sending said receipt into said cloud.

7. The method of claim 6, further comprising:
receiving said receipt at said device from said cloud.

8. The method of claim 1, wherein said customer has a subscription relationship to use said receipt store, and wherein said contact information is obtained by said customer as part of forming said subscription relationship.

9. The method of claim 1, further comprising:
identifying, based on said customer's receipts in said receipt store, a first product or first service in which said customer is interested; and
identifying, based on said customer's receipts in said receipt store and based on other customers' receipts in said receipt store, a level of popularity of a second product or second service.

10. The method of claim 9, further comprising:
providing, to said customer, a coupon for said first product or said first service.

11. A system comprising:
a device reader that receives, from a device, profile information that comprises payment account information of a customer and contact information of said customer, wherein said contact information identifies said customer by an e-mail address, an Instant Message (IM) address, a Uniform Resource Locator (URL), a phone number, or a Short Message Service (SMS) identifier;
a point-of-sale component that performs a transaction at a location at which said customer and said point-of-sale component are physically present together, and that generates a partial receipt for said transaction, said partial receipt not including an amount paid by said customer for transaction and not including a form of payment used for said transaction; and
a first component that receives said partial receipt from said point-of-sale component, that generates a receipt based on said partial receipt by adding said amount paid and said form of payment to said partial receipt, and that causes said receipt to be sent, via a network, to a receipt store identified by said contact information, wherein said receipt store is remote from said location at which said transaction occurs, said first component being separate from said point-of-sale component.

12. The system of claim 11, wherein said first component is said device reader, wherein said device reader sends said receipt to a cloud in which said receipt store is implemented as a service.

13. The system of claim 11, wherein said first component is said device reader, wherein said device reader causes said receipt to be sent to said receipt store by sending said receipt to said device, said device being carried by said customer and being configured to send said receipt to said receipt store.

14. The system of claim 11, wherein said customer has a subscription relationship to use said receipt store, and wherein said contact information is obtained by said customer as part of forming said subscription relationship.

15. The system of claim 11, wherein said device reader stores said receipt to said device.

16. The system of claim 11, said system identifying, based on said customer's receipts in said receipt store, a first product or first service in which said customer is said interested, and said system identifying, based on said customer's receipts in said receipt store and based on other customers' receipts in said receipt store, a level of popularity of a second product or second service.

17. The method of claim 16, said system providing, to said customer, a coupon for said first product or said first service.

* * * * *